May 23, 1950  E. M. SPLAINE  2,508,870
DETACHABLE LENS FOR ONE-PIECE CHANNELED MOUNTINGS
Filed Sept. 4, 1945
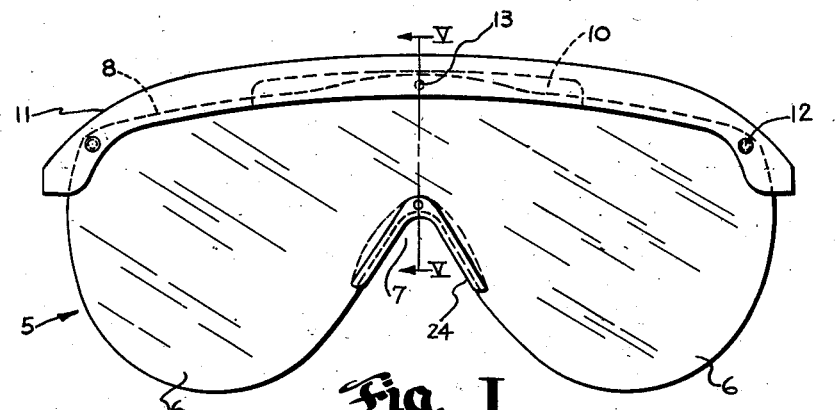
Fig. I
Fig. II
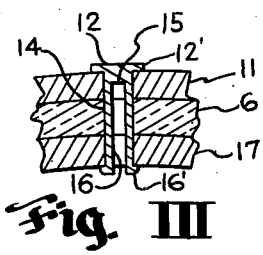
Fig. III
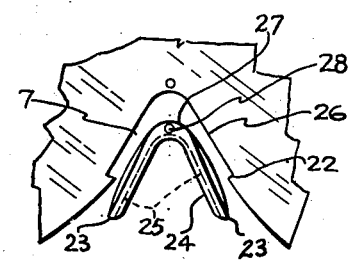
Fig. IV
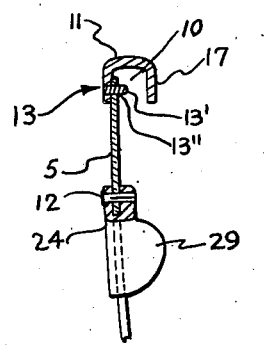
Fig. V
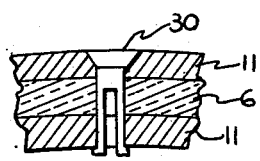
Fig. VI
INVENTOR
EDWARD M. SPLAINE
BY
Louis L. Gagnon
ATTORNEY Patented May 23, 1950

2,508,870

UNITED STATES PATENT OFFICE 2,508,870

DETACHABLE LENS FOR ONE-PIECE CHANNELED MOUNTINGS

Edward M. Splaine, Southbridge, Mass., assignor to American Optical Company, Southbridge, Mass., a voluntary association of Massachusetts Application September 4, 1945, Serial No. 614,150

2 Claims. (Cl. 88—41)

This invention relates to improvements in ophthalmic devices and more especially in eye protection devices, and has particular reference to a device embodying a transparent shield or lens for protecting the eyes from flying particles or the like and which transparent shield or lens may have embodied therein means for varying and controlling the light transmitted thereby. This invention is an improvement over that disclosed by copending application No. 568,282, filed December 15, 1944, now Patent 2,472,731 and entitled One-piece channeled lens mounting.

One of the principal objects of the invention is to provide a device of the above character which is light in weight, durable and which has its shield or lens supporting parts located above the useful field of vision of the wearer.

Another object is to provide a device of the above character having its shield or lens portion formed of initially flat sheet plastic material defining two lens portions supported by a reinforcing bar curved to conform substantially to the contour or curvature of the face of the wearer and being of sufficient rigidity to retain the shield or lens substantially to its curvature when said bar and lens are in assembled relation with each other.

Another object of the invention is to provide a device of the above character having a reinforcing bar curved to conform substantially to the curvature of the face of the wearer and a shield or lens portion formed of sheet plastic material defining two lens portions and detachably supported thereby so that it may be replaced by another shield or lens portion of different light transmitting properties when desired or replaced by a similar shield when the original is scratched, broken or otherwise damaged.

Another object is to provide a shield or lens supporting bar of the above character to which temples may be connected and having an intermediate thickened portion functioning as brow engagement means for retaining the shield or lens properly spaced relative to the eyes.

Another object is to provide a shield or lens formed of sheet plastic material defining two lens portions having a nasal recess in the lower edge thereof in combination with a nose engagement member having a grooved portion fitted in said nasal recess portion and adapted to receive the adjacent edge of the lens and to be detachably secured to said lens by suitable attaching means.

Another object is to provide a reinforcing bar of the above character having grooves and a recess extending longitudinally thereof and adapted to receive the edge of the shield or lens and in which the lens is detachably secured by suitable means.

Another object is to provide a brow engagement bar or brace bar of the above character having a recess or channelled portion formed therein for reducing the weight of the bar and for receiving a portion of the shield and allowing flexing thereof while the shield is being fitted to or removed from assembled position with the brace bar.

Another object is to provide a brace bar of the above character having integral perforated lug portions adjacent the opposed ends thereof to which temples may be pivotally connected and a fixed or integral lug or projection intermediate the ends for detachably securing the intermediate or central portion of the shield in assembled position.

Other objects and advantages of the invention will become apparent from the following description taken in connection with the accompanying drawings and it will be apparent that many changes may be made in the details of construction and arrangement of parts without departing from the spirit of the invention as expressed in the accompanying claims. The invention therefore is not to be limited to the exact details of construction and arrangement of parts shown and described as the preferred form only has been given by way of illustration.

Referring to the drawings:

Fig. 1 is a front elevational view of the device embodying the invention;

Fig. 2 is a bottom view of the device;

Fig. 3 is an enlarged sectional view taken on line 3—3 of Fig. 2;

Fig. 4 is a fragmentary view showing certain parts of the device of Fig. 1 in position to be assembled;

Fig. 5 is a sectional view taken on line 5—5 of Fig. 1 and looking in the direction indicated by the arrows; and Fig. 6 is a view similar to Fig. 3 but showing a modified form of attaching means.

Referring more particularly to the drawings wherein like characters of reference designate like parts throughout the several views, the device embodying the invention comprises a sheet of transparent material 5 shaped to provide a pair of integral shield or lens portions 6 and a nasal recess 7 in the lower edge thereof as shown best in Fig. 4. The said integral shield or lens portions 6 are preferably blanked from sheet plastic material, such as cellulose acetate, methyl methacrylate, or any other known transparent artificial resinous materials or may be formed of sheet plastic material sold under the trade name "Polaroid" and may have any desired light absorbing characteristics or color obtained by using proper light absorbing dyes incorporated within the plastics or artificial resinous material or by incorporating therein means for absorbing in the extra visual regions.

The integral shield or lens portion 6 is provided with an upper curved edge 8 adapted to fit within a pair of laterally spaced slots or seats 9 and a central recess 10 formed longitudinally of a reinforcing bar or support 11. The bar or support 11 may be formed of any suitable material, preferably moldable plastic material, such as for example, cellulose acetate, methyl methacrylate or other known artificial resinous materials or may be formed of cellulose nitrate or the like depending upon the nature of the material used for the shield or lens portion. The sheet material 5 is removably secured within the longitudinal slots or seats 9 and recess 10 by means of retaining members 12 located near the opposite ends of the bar 11 and by a slot and pin connection 13 or the like intermediate the ends of the bar. Each retaining member 12, as best shown in Fig. 3, is arranged to extend through an aperture 14 formed in the bar 11 and sheet material 5 and may be formed as a pin having a head 12' at one end and a central slot 15 extending inwardly from the other end a substantial distance centrally thereof to provide resilient arms 16. These arms are of sufficient length to extend completely through the bar and sheet material and are provided with slightly enlarged ends 16' for engaging the outer surface of the bar adjacent the aperture 14 and keeping the retaining member in place. The connection 13 is preferably formed by the provision of a fixed pin 13' extended through the front wall of the bar 11 and terminating centrally within the recess 10 or by the provision of an equivalent lug formed integrally with the bar 11 and extending rearwardly therefrom in said recess. The fixed pin or integral lug is arranged to enter a perforation 13'' in the sheet material 5 near the upper edge thereof.

The support or bar 11 is preferably curved substantially to the contour shape or curvature of the face of the wearer and is provided with an intermediate portion of increased thickness for accommodating the recess 10 and providing a rear surface 17 for engaging the brow of the wearer when in position of use and being adapted to space the shield or lens portions 6 from the eyes an amount sufficient to clear the eyelashes of the wearer. The recess 10 is also provided for decreasing the weight of the bar. The said support or bar 11 is provided adjacent its opposed ends with portions 18 tapering outwardly from said intermediate portion and terminating in temple lugs 19 preferably formed of the same material as the support or bar 11 either integrally therewith or separately and joined therewith by a suitable cement, solvent or other adhesive. Suitable temples 20 formed of material similar to the support or bar member 11 are secured to the lugs 19 preferably by hinge members 21 either formed of the same material and formed integrally with the temples 20, or formed separately and of metal in which instance the said hinge members would be secured to the temples 20 by rivets or the like.

The sheet material 5, in the vicinity of the nasal recess 7, is provided, as best shown in Fig. 4, with shouldered portions 22 adapted to receive the ends 23 of a nose engagement member 24. The said nose engagement member 24 is shaped substantially to the contour shape of the nasal recess 7 but in Fig. 4 has its lower ends 23 slightly pressed toward each other for insertion into the recess 7. The member 24 is provided with a slot 25 to receive the edge 26 of the shield or lens portion adjacent said nasal recess. The nose engagement member 24 is also detachably secured to the shield or lens portion 6 in a manner somewhat similar to the support or bar 11 and may be formed of the same materials as set forth for said bar 11. The central portion 27 of the nose member 24 is extended upwardly above the slot 25 sufficiently to provide room for an aperture 28 through which a retaining member 12 is placed for securing the member 24 detachably to the sheet material 5 when assembled. The said nose engagement member 24 is provided with integral pad portions 29 for engaging the opposed sides of the nose, it being understood that the said pads are suitably angled for proper and comfortable fit with the nose of the wearer.

It is particularly pointed out that the shield or lens portions 6 are initially formed of flat material and that when detachably secured within the slots 9 and recess 10 of bar 11, the said shield or lens portions are curved to fit within said slots and recess and are adapted to be retained substantially to said curvature of the slots and the front edge of the recess during the use of the device. The said shield or lens portions may be tinted red, green, or any other desirable color as well as embodying any other absorptive characteristics desired. While the support or bar member 11 is described as being curved substantially to the contour or curvature of the face, the said curvature is also so controlled as to reduce reflection of light incident on the shield or lens portion from a direction rearwardly of the wearer.

The shield or lens portion 6 may be cut, blanked, or otherwise shaped to the contour shape desired from sheet material having the proper characteristics required. In instances when the shield or lens portion 6 is formed of relatively thin material it may be merely bent to the curvature of the bar through the securing thereof within the slots or seats 9 and recess 10 with the bar 11 being solely depended upon for retaining the shield or lens to the desired curvature. In instances when the shield or lens is formed of relatively thick material, the said lens is preferably formed and set substantially to the curvature of the bar 11 and is then inserted within the slots or seats 9 and recess 10. In this latter instance, the bar 11, of course, aids in retaining the shield or lens portion 6 to said desired curved shape.

When it is desired to assemble the parts of the device for use, the upper edge 8 of the shield or lens portion 6 is placed a part of the way into the slots 9 and recess 10 and the upper central portion of the shield is then flexed rearwardly sufficiently to clear the rear edge of the pin or lug 13'. While so flexed the shield is then moved further into said slots and recess until the perforation 13'' slips over the end of the pin or lug 13' and the inherent resiliency of the sheet material springs the upper edge 8 back into its normal position shown in Fig. 2. The retaining members 12 at the opposite ends of the bar 11 are then inserted through the bar and shield to securely hold these parts in place. The nose member 24 is in a somewhat similar manner engaged with the shield 6 by first slightly flexing the lower ends 23 thereof toward each other to clear the shouldered portions 22 on the lower edge of the shield as the edge 26 is brought into engagement with the slot 25 formed in the nose engagement member 24. When the ends 23 are released they spring outwardly and engage the shoulders 22. A retaining member 12 is then positioned through the aperture 28 in the upper part of the nose member 24 and through the shield to secure these parts together.

Thus it will be seen that the bar 11, shield 6 and nose engagement member 24 may as easily be disassembled if desired, such as when desiring to change shields having different light transmitting properties, or when replacing a scratched or damaged shield by a new shield.

When desired a retaining member 30, as shown in Fig. 6, may be employed instead of each retaining member 12 for holding the assembled bar and shield or the shield and nose member securely in place. The member 30 has a beveled head which may be seated or countersunk into an outer surface of the bar or nose engagement member so as to lie flush with said surface, thus avoiding any protuberance or edge which might otherwise catch into things and even be accidentally dislocated thereby during use.

Ordinarily, the bar 11 and end pieces 19, and likewise the nose bearing portion 24, will be formed as integral members by an injection molding process. The shield or lens portion 6 may be treated with suitable dyes or the like for producing the required absorptive characteristics, color, etc. The bar portion 11 and nose member may be colored to produce any desired effect by brushing or spraying a suitable dye or the like thereon.

From the foregoing description it will be seen that simple, efficient, and economical means have been provided for accomplishing all the objects and advantages of the invention.

Having described my invention, I claim:

1. An ophthalmic mounting of the character described comprising a bar-like support curved in the general direction of the face of the wearer and having a longitudinally extending groove in the underside thereof and temple connection means adjacent its ends, said groove, throughout a portion of the central area of the support, being of increased width, said support having a projection member extending from the front wall thereof inwardly of the portion of the groove of increased width and of a length less than the width of said portion of the groove, a shield of flexible normally flat transparent sheet material having its upper edge shaped to be detachably fitted within the groove and having an opening spaced inwardly of said upper edge and adapted to receive the projection member and to be held in assembled relation therewith by the curving of the shield when positioned in the groove and detachable connection means adjacent the opposed ends of the shield and bar-like support for securing said ends together to retain said shield in said groove and to said curved shape.

2. An ophthalmic mounting of the character described comprising a bar-like support curved in the general direction of the face of the wearer and having a longitudinally extending groove in the underside thereof and temple connection means adjacent its ends, said groove, throughout a portion of the central area of the support, being of increased width, said support having a projection member extending from the front wall thereof inwardly of the portion of the groove of increased width and of a length less than the width of said portion of the groove, a shield of flexible normally flat transparent sheet material having its upper edge shaped to be detachably fitted within the groove and having an opening spaced inwardly of said upper edge and adapted to receive the projection member and to be held in assembled relation therewith by the curving of the shield when positioned in the groove, the end portions of said shield and support having aligned openings therein, and retractable collapsible members extending through said openings for detachably securing said end portions together to retain the shield in said groove and to said curved shape.

EDWARD M. SPLAINE.

REFERENCES CITED

The following references are of record in the file of this patent:

UNITED STATES PATENTS

| Number | Name | Date |
| --- | --- | --- |
| 1,238,396 | Elwood | Aug. 28, 1917 |
| 1,596,019 | Nelson | Aug. 17, 1926 |
| 1,685,126 | Evans | Sept. 25, 1928 |
| 2,155,693 | Tanasso et al. | Apr. 25, 1939 |
| 2,187,810 | Rentz | Jan. 23, 1940 |
| 2,191,937 | Low | Feb. 27, 1940 |
| 2,192,208 | Stevens | Mar. 5, 1940 |
| 2,337,617 | Miller, Jr. | Dec. 28, 1943 |
| 2,360,482 | Evans | Oct. 17, 1944 |
| 2,387,849 | Lehmberg et al. | Oct. 30, 1945 |
| 2,387,851 | Lown et al. | Oct. 30, 1945 |
| 2,397,243 | Cooper | Mar. 26, 1946 |
| 2,423,539 | Williams | July 8, 1947 |
| 2,444,498 | Cochran | July 6, 1948 |